US006874281B2

(12) United States Patent
Fujita et al.

(10) Patent No.: US 6,874,281 B2
(45) Date of Patent: Apr. 5, 2005

(54) WEATHER STRIP FOR CAR WITHOUT METAL INSERT

(75) Inventors: Yasuyuki Fujita, Hiroshima-ken (JP); Syuuji Raisu, Hiroshima-ken (JP)

(73) Assignee: Nishikawa Rubber Co., Ltd., Hiroshima-ken (JP)

( * ) Notice: Subject to any disclaimer, the term of this patent is extended or adjusted under 35 U.S.C. 154(b) by 0 days.

(21) Appl. No.: 10/643,470

(22) Filed: Aug. 19, 2003

(65) Prior Publication Data

US 2004/0040215 A1 Mar. 4, 2004

(30) Foreign Application Priority Data

Sep. 3, 2002 (JP) ....................................... 2002-257586
Jan. 6, 2003 (JP) ....................................... 2003-000168

(51) Int. Cl.[7] ................................................ B60J 10/00
(52) U.S. Cl. ...................... 49/490.1; 296/146.9; 296/76
(58) Field of Search ................................ 296/146.9, 76, 296/1.06; 49/490.1

(56) References Cited

U.S. PATENT DOCUMENTS 4,461,507 A * 7/1984 Minami et al. ............... 296/76
4,474,402 A * 10/1984 Shelton ........................ 296/76
4,970,102 A * 11/1990 Guillon ....................... 428/122
5,347,759 A * 9/1994 Kobayashi et al. ........ 49/496.1
5,411,785 A * 5/1995 Cook .......................... 428/122
5,626,383 A * 5/1997 Lee et al. ................ 296/146.9
6,023,888 A * 2/2000 Dover ......................... 49/441

OTHER PUBLICATIONS

Efunda engineering fundamentals, web site www.efunda.com/units/hardness/convert, pp.1–2.*

* cited by examiner

*Primary Examiner*—Dennis H. Pedder
(74) *Attorney, Agent, or Firm*—Flynn, Thiel, Boutell & Tanis, P.C.

(57) ABSTRACT

There is provided a weather strip for a car without a metal insert which comprises a grip part having a U-shaped grip body in section and a seal part integrally molded to the outer surface of the grip part. The weather strip is installed to a flange provided to a door opening, a trunk portion and the like. The grip body is unprovided with a metal insert, and, at least, the bottom wall and the inner wall of the grip part is made of highly hardened rubber or resin having a hardness of more than Hs 90 degree.

3 Claims, 7 Drawing Sheets

WEATHER STRIP FOR CAR WITHOUT METAL INSERT

FIELD OF THE INVENTION

This invention relates to a weather strip for a car, which does not comprise a metal insert (an insert made of metal), thereby performing a weight reduction, improvement of productivity and recycling.

BACKGROUND OF THE INVENTION

A prior art will be described hereinafter referring to FIGS. 1 to 3. Generally, a weather strip installed to a door opening 1, a trunk portion 2, etc. is composed of a U-shaped grip part 21 and a hollow seal part 22, and the grip part 21 holds a flange 3 formed along the door opening 1, etc. A metal insert is embedded in the grip part 21 in order to improve a holding strength of the grip part 21 against the flange 3.

Further, a weather strip 20 comprising the metal insert 23 is formed by a die molding and the die molded parts are connected to parts formed by an extrusion molding, since corner portions thereof cannot be formed by the extrusion molding.

However, since the insert embedded in the grip part 21 is made of a metal, the weather strip 20 becomes heavier, and such is undesirable in achieving weight reduction of a car. It is also undesirable in productivity since it requires a process of embedding the metal insert 23 in the grip part 21. Further, a weather strip 20 comprising the metal insert 23 therein easily rusts and it raises a problem in safetiness in a installation operation.

Further, the weather strip according to the prior art has a drawback in molding operations as the corner portions thereof are die molded and are connected to extrusion molded parts.

This invention is invented in view of those drawbacks, and it is an object of the invention to provide a weather strip for a car which does not comprise a metal insert, thus, it is superior in productivity, it does not rust and it is highly safety in an installation operation. Further, it is another object of this invention to provide a molding method of a weather strip easily operated.

SUMMARY OF THE INVENTION

A weather strip for a car without a metal insert according to a first aspect of the invention comprises a grip part 11 having a U-shaped grip body 12 in section and inner lips 13 integrally molded to the inner surface of the grip body 12. A cover lip or a garnish lip 14 is integrally molded to the outer surface of the grip body 12. A seal part 15 is provided to the grip part 11 at an outer side of the cover lip or the garnish lip 14. The weather strip is installed by having the grip part 11 hold a flange 3 provided to a door opening 1, a trunk portion 2 and the like. The grip body 12 is unprovided with a metal insert, and, at least, the bottom wall 12*a* and the inner wall 12*b* of the grip part 11 is made of highly hardened rubber or resin having a hardness of more than Hs 90 degree.

A weather strip for a car without a metal insert according to a second aspect of the invention comprises a grip part 11 having a U-shaped grip body 12 in section and inner lips 13 integrally molded to the inner surface of the grip body 12. A cover lip or a garnish lip 14 is integrally molded to the outer surface of the grip body 12. A seal part 15 is provided to the grip part 11 at an outer side of the cover lip or the garnish lip 14. The weather strip is installed by having the grip part 11 hold a flange 3 provided to a door opening 1, a trunk portion 2 and the like. The grip body 12 is unprovided with a metal insert, and, at least, the bottom wall 12*a* and the inner wall 12*b* of the grip part 11 is made of highly hardened rubber or resin having a hardness of more than Hs 90 degree. Further, at least, the inner wall 12*b* of the grip part 11 is provided with notches 16.

A weather strip for a car without a metal insert according to a third aspect of the invention comprises a grip part 11 having a U-shaped grip body 12 in section and inner lips 13 integrally molded to the inner surface of the grip body 12. A cover lip or a garnish lip 14 is integrally molded to the outer surface of the grip body 12. A seal part 15 is provided to the grip part 11 at an outer side of the cover lip or the garnish lip 14. The weather strip is installed by having the grip part 11 hold a flange 3 provided to a door opening 1, a trunk portion 2 and the like. The grip body 12 is unprovided with a metal insert, and, at least, the bottom wall 12*a* and the inner wall 12*b* of the grip part 11 is made of highly hardened resin having a hardness of more than Hs 90 degree. Further, at least, the inner wall 12*b* of the grip part 11 is provided with slits.

A weather strip for a car without a metal insert according to a fourth aspect of the invention correlates to the second aspect of the invention wherein, inner lips 13 are provided at the inner surface of the inner wall 12*b* of the grip 11, and notches 16 are provided over the inner lips 13 and the inner wall 12*b*.

A weather strip for a car without a metal insert according to a fifth aspect of the invention comprises a grip part 11 having a roughly flat-shaped grip body 12 in section and a seal part 15 integrally molded to the outer surface of the grip part 11. The weather strip is installed by securing the grip part 11 with clips 17 to a flange 3 provided to a door opening 1, a trunk portion 2 and the like. The grip body 12 is unprovided with a metal insert, and, at least, the bottom wall 12*a* and the inner wall 12*b* of the grip part 11 is made of highly hardened rubber or resin having a hardness of more than Hs 90 degree.

A weather strip for a car without a metal insert according to a sixth aspect of the invention correlates to the first to fifth aspects of the invention wherein, the grip body 12 is provided with a high rigid material 18 made of highly hardened rubber or resin having a hardness of more than Hs 90 degree. The high rigid material 18 is partially exposed at the inner surface, outer surface or both surfaces of the grip body 12.

A weather strip for a car without a metal insert according to a seventh aspect of the invention correlates to the first to fourth and sixth aspects of the invention wherein, the grip body 12 is bent along a shape of a corner, and is heated and cooled.

A weather strip for a car without a metal insert according to a eighth aspect of the invention correlates to the first to fourth and sixth aspects of the invention wherein the grip body 12 is bent along a shape of a corner with the remaining heat of the extrusion heat molding.

A weather strip for a car without a metal insert according to a ninth aspect of the invention correlates to the first to fourth and sixth to eighth aspects of the invention wherein, the inner wall 12*b* of the grip part 11 made of highly hardened rubber or resin having a hardness of more than 90 degree is longer than the outer wall 12*c* of the grip part 11 made of highly hardened rubber or resin having a hardness of more than 90 degree.

PREFERRED EMBODIMENT OF THE INVENTION

Figure 4:
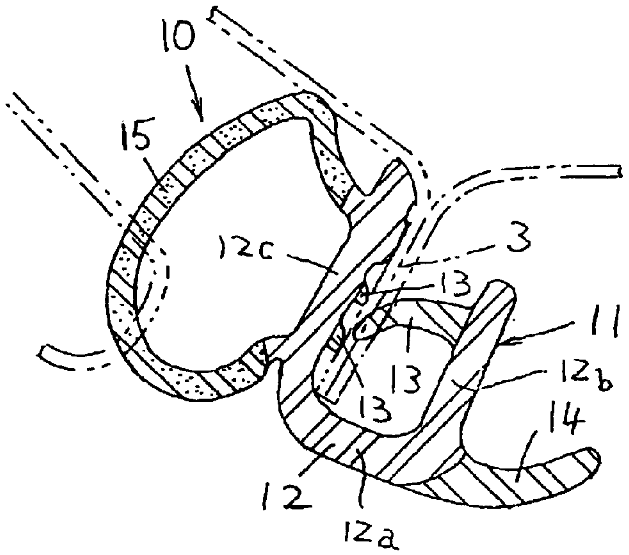
FIG. 4 shows a sectional view of a first embodiment of the invention along line I—I in FIG. 1.

A first embodiment of a weather strip for a car without a metal insert according to the invention is illustrated in FIG. 4. This weather strip 10 comprises a grip part 11 and a hollow seal part 15. The grip part 11 comprises a grip body 12 formed into a U-shape figure in section, a plural number of inner lips 13 integrally molded to both inner surfaces of the grip body 12, and a garnish lip 14 integrally molded to the outer surface of the inner wall 12*b* of the grip body 12. The grip part 11 is installed in a posture holding the flange 3 provided at the door opening. The seal part 15 is integrally molded to the outer surface of the outer wall 12*c* of the grip body 12, and it makes a resilient contact with a door panel, sealing a gap between the body and the door of a car. The seal part 15 is not limited to a hollowed shape and it may be formed into a lip shape.

The grip body 12 is not embedded with a metal insert, and the entire portion of the grip body 12 is made of EPDM solid rubber, highly hardened rubber, whose hardness is more than Hs 90 degree (this value is obtained based on a spring hardness test). The inner lips 13 and the garnish lip 14 are made of rubber having a normal hardness of Hs 0 to 80 degree (in this invention, this rubber may have a hardness of Hs 40 to 60 degree), and the seal part 15 is made of sponge rubber.

This weather strip 10 does not comprise a metal insert, so that the weight reduction can be achieved in the weather strip 10 as well as a car having the weather strip 10. Further, a process of embedding the metal insert is unneeded, so that it can reduce a production cost and improves productivity. The grip body 12 is made of highly hardened rubber, so that, although it does not comprise a metal insert, it can maintain the holding strength against the flange 3 as firm as the weather strip of the prior art having a metal insert.

Figure 5:
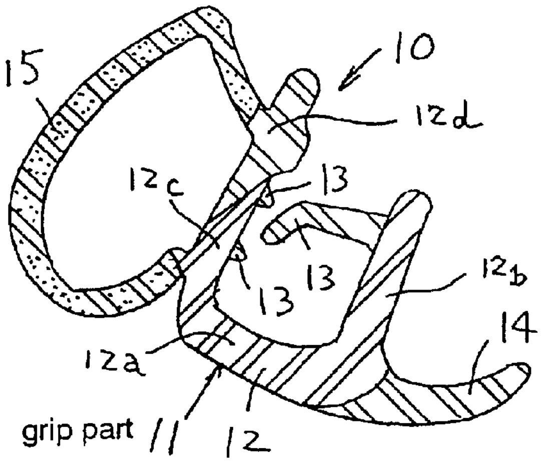
FIG. 5 shows a sectional view of a second embodiment of the invention.
Figure 6:
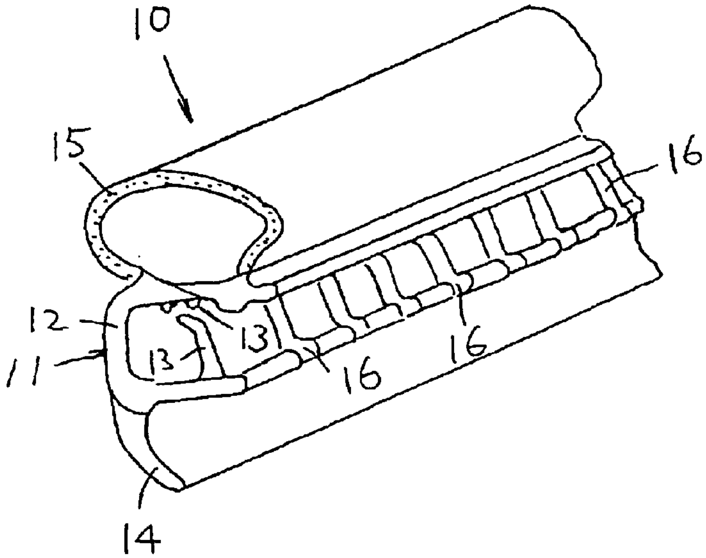
FIG. 6 shows a perspective view of a second embodiment of the invention.

A weather strip for a car without a metal insert according to a second embodiment of the invention is illustrated in FIGS. 5 and 6. This weather strip 10 is characterized in that the grip body 12 does not comprise a metal insert, and most of and not entire of the grip body 12 excluding a part 12*d* thereof is made of highly hardened rubber having a hardness of more than Hs 90 degree, while the part 12*d* is made of material (rubber or resin) having a normal hardness. Further, a plural number of notches 16 are formed in one side of the grip part 11 where the seal part 15 is not integrally molded and in the inner lips 13 projectingly molded from the same side of the grip part 11. In the embodiments illustrated in FIGS. 4, 5 and 6, it is exemplified that all of the inner lips 13 are made of rubber having a normal hardness. However, the smaller projection type of inner lips 13 provided in the outer wall 12*c* may be made of highly hardened rubber.

According to the above mentioned embodiment, the grip body 12 is partially made of material having a normal hardness and the grip part 11 as well as the inner lips 13 are provided with the notches 16, so that its followability against the corner portions of the door opening 1, etc. is enhanced, and it is easily installed to the flange 3. Further, the inner lips 13 have portions where the notches 13 are unprovided, so that its holding performance against the corner portions are also maintained.

Figure 7:
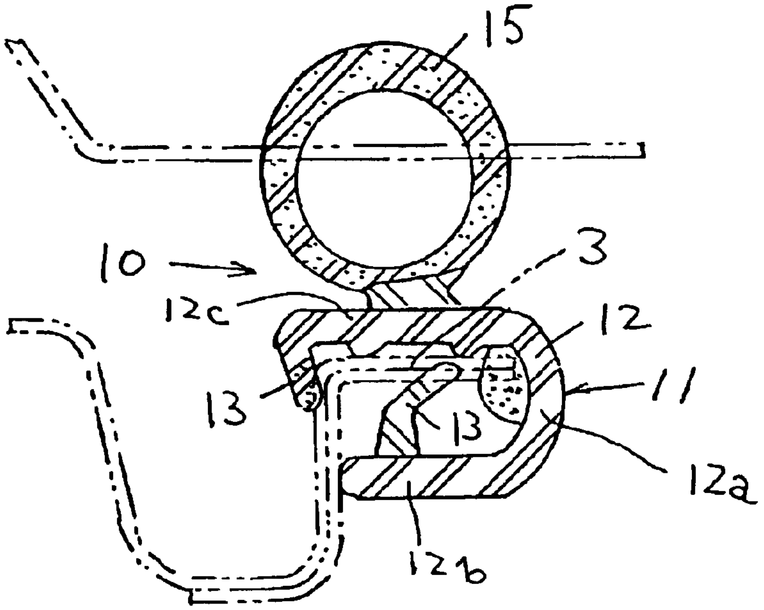
FIG. 7 shows a sectional view of a third embodiment of the invention along line II—II in FIG. 1.

A weather strip for a car without a metal insert according to a third aspect of the invention is illustrated in FIG. 7. This weather strip 10 comprises a grip part 11 having a grip body 12 formed into an U-shape figure in section and a plural number of inner lips 13 integrally molded at the inner surface of the grip body 12, and a seal part 15 integrally molded at the outer surface of the outer wall 12*c*. This weather strip is installed by having the grip part 11 hold the flange 3 provided at the door opening 1 of a car.

The grip body 12 does not comprise a metal insert, and the entire portion of the grip body 12 and the entire or part of each inner lip 13 are made of EPDM solid rubber having a hardness of more than Hs 90 degree.

According to this embodiment, the weather strip 10 does not comprise a metal insert, so that it can achieve weight reduction and improve productivity. Further, the grip part 12 is made of highly hardened rubber material, so that it is firmly secured to the flange 3.

Figure 8:
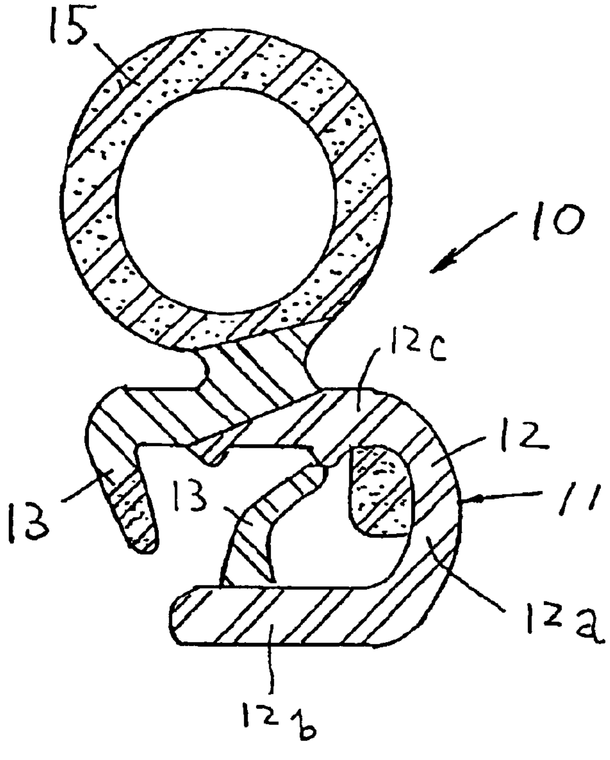
FIG. 8 shows a sectional view of a fourth embodiment of the invention.
Figure 9:
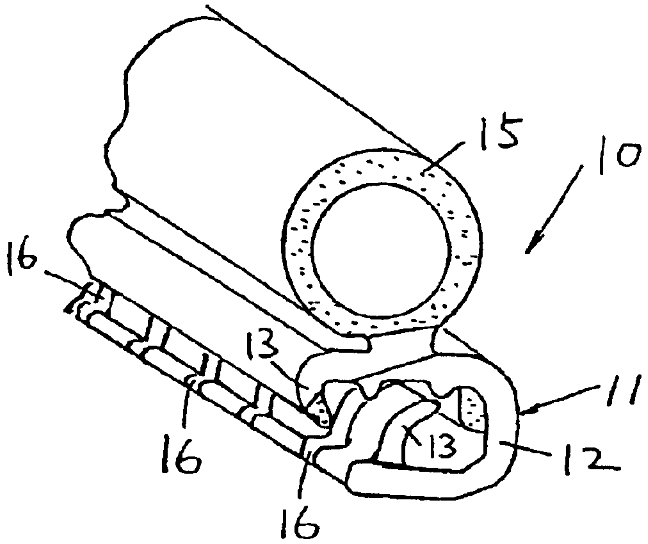
FIG. 9 shows a perspective view of a fourth embodiment of the invention.

A weather strip for a car without a metal insert according to a fourth embodiment of the invention is illustrated in FIGS. 8 and 9. This weather strip 10 comprises a grip body 12 most of which excluding a part is made of highly hardened rubber material having a hardness of more than 90 degree, while the part is made of material having a normal hardness. The grip part 11 is intermittently provided with notches 16 at a portion where the seal part 15 is unprovided. According to this weather strip 10 comprising such structure, a followability of the weather strip 10 against the corner portions is improved and an installation operation to the flange 3 becomes easier.

Figure 10:
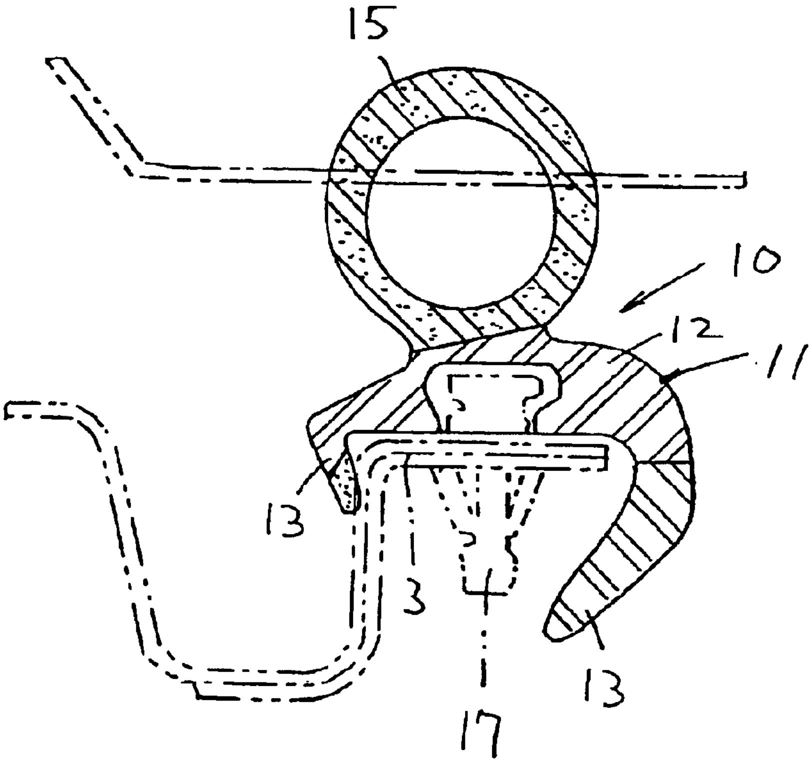
FIG. 10 shows a sectional view of a fifth embodiment of the invention along line II—II in FIG. 1.

A weather strip for a car without a metal insert according to a fifth embodiment of the invention is illustrated in FIG. 10. This weather strip 10 comprises a grip part 11 and a hollow seal part 15. The grip part 11 comprises a roughly flat-shaped grip body 12 in section, and an inner lip 13 and a garnish lip 14 both integrally molded at the inner edge sides of the grip body 12. The seal part 15 is integrally molded to the outer surface of the grip body 12. The weather strip 10 is installed to a flange 3 provided at the trunk portion 2 of a car with a plural number of clips 17 which secure the grip body 12 to the flange 3. The grip body 12 does not comprise a metal insert, and its entire portion is made of highly hardened rubber material having a hardness of more than Hs 90 degree. The flange 3 and the grip body 12 are provided with holes for passing the clips 17 therethrough.

According to this weather strip 10, the roughly flat-shaped grip body 12 in section is made of highly hardened rubber material, so that it can be firmly installed to the flange 3 with the clips 17. Further, a metal insert is not embedded, so that a weight reduction of the weather strip 10 and a car having the weather strip 10 can be achieved, and that an operation of embedding the metal insert is eliminated, thereby enhancing productivity.

In many of the embodiments disclosed in this specification, most portion of the grip body 12 is made of highly hardened rubber material. This "most portion" includes at least the inner wall 12*b* and the bottom wall 12*a* and it indicates any embodiment where a border line between material having a normal hardness and material having a highly hardened hardness is present in any area of the outer wall 12*c*.

The notches 16 may be provided at a certain area or they may be provided at an entire area. The notches 16 are preferably formed with an interval of 5 mm, and they are also preferably formed at an area where one end thereof is 20 mm apart from the end edge of R (radius) of a corner portion of a car body.

Figure 11:
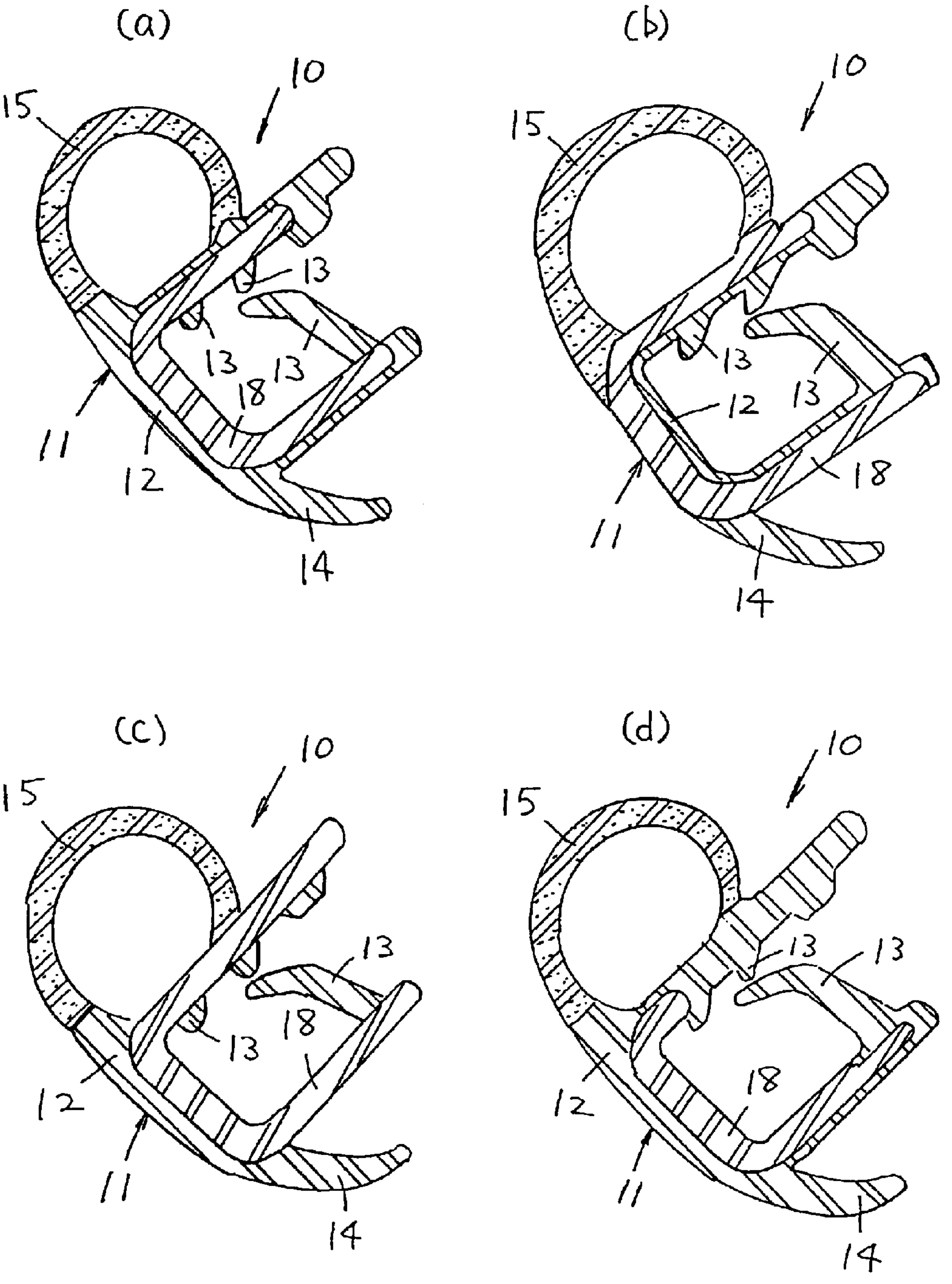
FIG. 11 shows a sectional view of a sixth embodiment of the invention.

In case the grip body 12 embeds a high rigid material 18 made of highly hardened rubber material instead of a metal insert like embodiments shown in FIG. 11, the notches 16 can be formed either before or after the extrusion molding process of the weather strip 10. The notches 16 can be formed before the extrusion molding process by providing notches merely to the high rigid material 18 prior to the extrusion. The notches 16 can be formed after the extrusion by providing notches 16 to the grip body 12 including the high rigid material 18 embedded in the grip body 12.

A weather strip for a car without a metal insert according to a sixth embodiment of the invention is illustrated in FIG. 11. This weather strip 10 comprises a grip part 11 and a seal part 15. The grip part 11 comprises a grip body 12 shaped into an U-figure in section and inner lips 13 integrally molded to the inner surface of the grip body 12. The seal part 15 is integrally molded to the outer surface of the grip body 12. This weather strip 10 is installed to a flange 3 provided at a door opening 1 or a trunk portion 2 of a car by having the grip part 11 hold the flange 3.

The characteristic of this weather strip 10 is that the grip body 12 is provided, instead of a metal insert, with a high rigid material 18 including highly hardened rubber material (or highly hardened resin) in such manner that the high rigid material 18 exposes its inner surface side, outer surface side or both surface sides. FIGS. 11(*a*) and (*d*) illustrates an embodiment where the high rigid material 18 exposes about the entire portion of its inner surface side, whereas (*b*) illustrates another embodiment exposing a large portion of the outer surface side, and (*c*) illustrates an embodiment exposing nearly the entire portion of the inner surface side and a large portion of the outer surface side.

This weather strip 10 embeds the high rigid material 18 made of highly hardened rubber material instead of a metal insert, so that it does not rust, and that a safety operation can be obtained in an installation process. Further, it can improve productivity by means of weight reduction.

Moreover, the high rigid material 18 exposes its inner surface side, etc. and it is not coated by such material as resin having a normal hardness, so that it can save resin material and reduce a production cost. The high rigid material 18 is superior in adhesion with resin material having a normal hardness, so that it can be formed in such a exposed structure. For example, as shown in FIG. 11(*a*), the high rigid material 18 is directly bound with a plural number of inner lips 13. Such structure can be completed by means of a superior adhesion performance the high rigid material 18 possesses.

Figure 12:
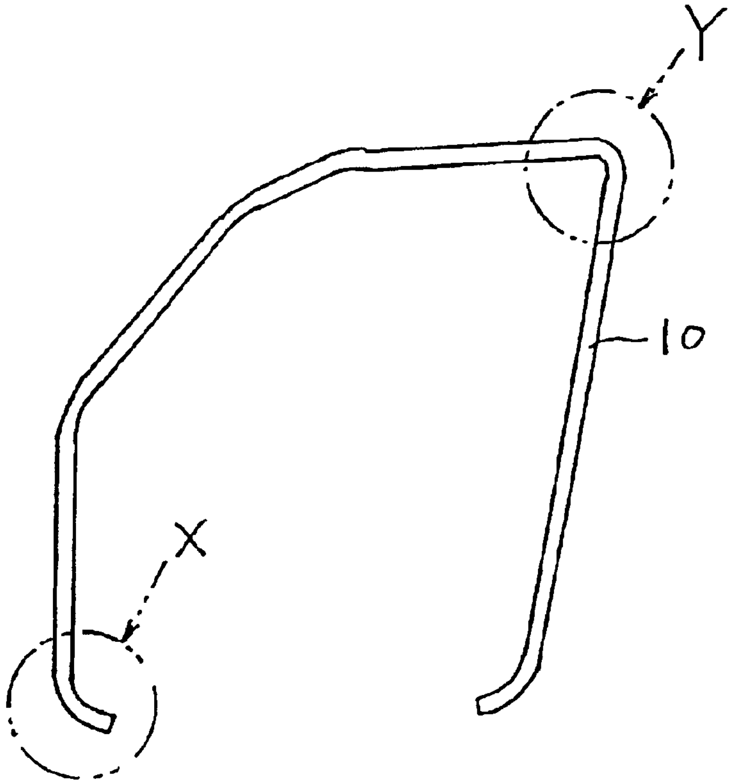
FIG. 12 shows a side view of a weather strip according to the invention which is formed in a bending method.
Figure 13:
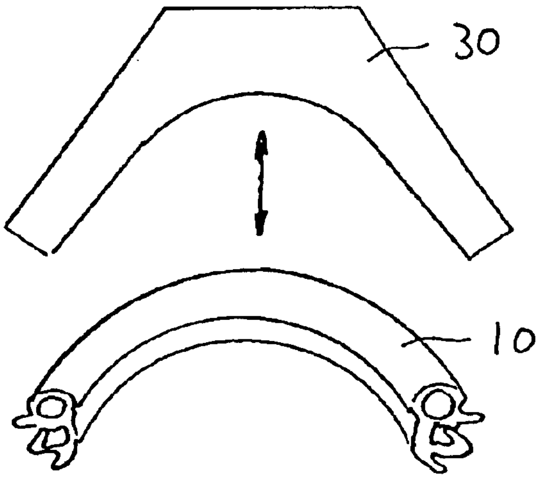
FIG. 13 shows a rough plane view of a first embodiment of a bending method used in forming a weather strip of the invention.

A method for bending a weather strip for a car without a metal insert is illustrated in FIGS. 12 and 13. This weather strip 10 comprises a grip part 11 having a U-shaped grip body 12 in section and inner lips 13 integrally molded to the inner surface of the grip body 12, and a seal part 15 integrally molded to the outer surface of the grip body 12. This weather strip 10 is installed to a flange 3 provided at such as a door opening 1 or a trunk portion 2 of a car body by having the grip part 11 hold the flange 3.

In this method, as a part of the grip body 12, the high rigid material having a hardness of more than Hs 90 degree is co-extruded with material forming the rest portion of the grip body 12, where the high rigid material 18 exposes about its entire inner surface.

Figure 1:
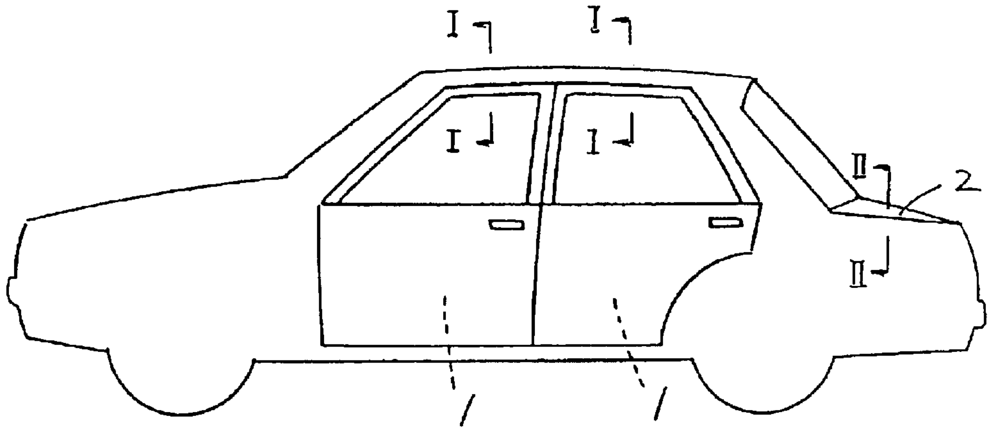
FIG. 1 shows a side view of a car comprising a weather strip.
Figure 2:
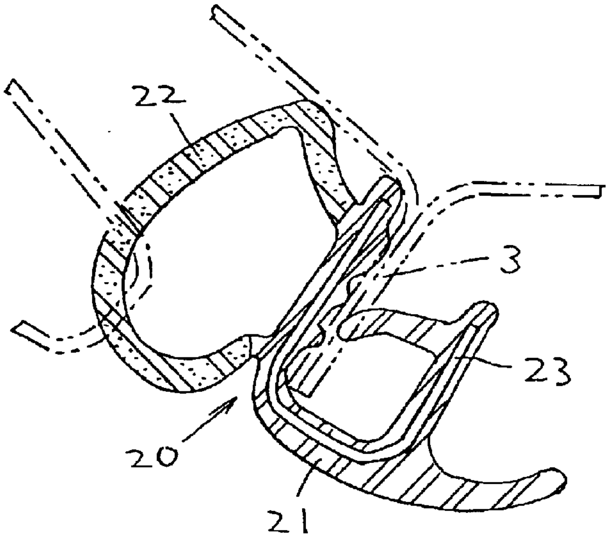
FIG. 2 shows a sectional view of an example of a prior art along line I—I in FIG. 1.
Figure 3:
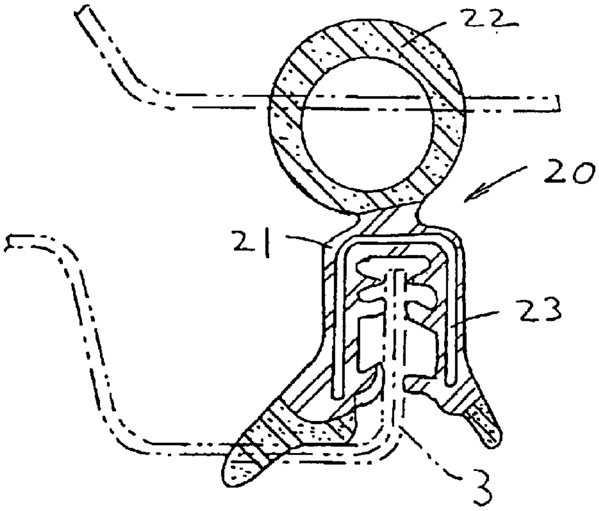
FIG. 3 shows a sectional view of an example of a prior art along line II—II in FIG. 1.

Then, while the remaining heat of the co-extrusion molding is still available, the grip body 12 is bent by a jig 30 along a shape of a corner portion. This bending method is effective especially in forming a corner having a larger radius as shown with "X" in FIG. 1.

According to this bending method, it is easy to form a corner portion in the weather strip 10, so that it is unneeded to provide die molded portions in the weather strip 10. Therefore, it can make a production operation easier, improve productivity and reduce a production cost to a great extent.

Figure 14:
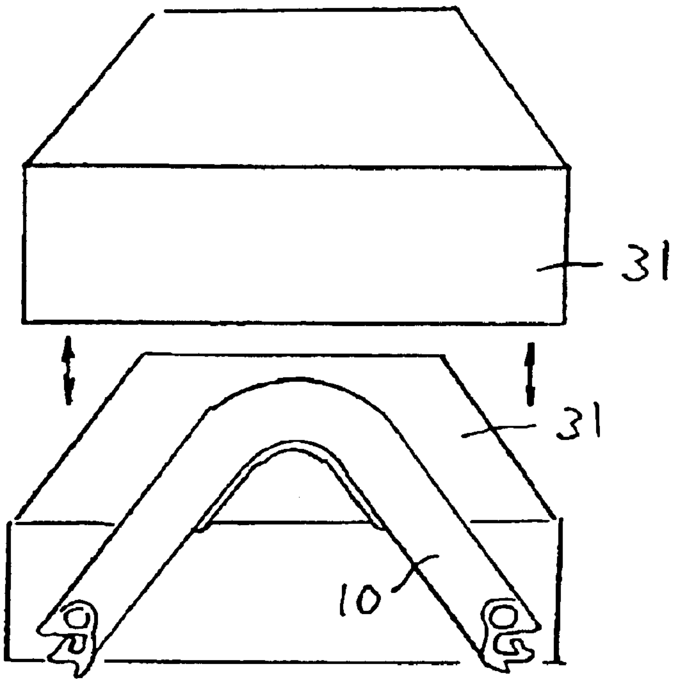
FIG. 14 shows a rough plane view of a second embodiment of a bending method used in forming a weather strip of the invention.

Another method for bending a weather strip for a car without a metal insert is illustrated in FIGS. 12 and 14. In this method, a grip body 12 is formed by co-extruded high rigid material 18 having a hardness of more than Hs 90 degree instead of comprising a metal insert, in a manner that about the entire portion of the inner surface side is exposed.

Then, the grip body 12 is placed in a die mold 31 and it is heated and reformed into a shape along the figure of the corner part. This method is effective in bending a corner having a smaller radius as indicated with "Y" in FIG. 12. This bending method using the die mold 31 is more effective if it is done while the remaining heat is still available right after the co-extrusion molding.

According to this bending method, molded parts are unneeded either, so that it can achieve an easy molding operation and reduce a production cost to a great extent.

According to a weather strip 10 for a car without a metal insert of the invention, a U-shaped grip body 12 in section does not comprise a metal insert, and its bottom wall 12*a* and inner wall 12*b* are made of highly hardened rubber or resin, so that it is possible to achieve weight reduction of the weather strip 10 as well as a car comprising the weather strip 10, while maintaining a firm holding strength of the grip body 12 against a flange 3. Further, an operation of embedding a metal insert in the grip body 12 is curtailed, so that productivity can be enhanced.

According to a weather strip for a car without a metal insert of the invention, it can also achieve weight reduction of the weather strip 10 and a car having the weather strip 10, and improve productivity, as well. Further, at least the inner wall 12*b* of the grip part 11 is provided with notches 16 or slits, so that it can improve its followability against corner portions, and that it makes an easy installation operation against the flange 3. Moreover, the highly hardened rubber or resin is provided up to the top edge of the outer wall 12*c*, while making the notches 16 or slits in the outer wall 12*c*.

According to a weather strip for a car without a metal insert of the invention, it can perform weight reduction and improvement of productivity. Further, a grip part 11 and inner lips 13 are provided with notches 16 or slits, so that followability of the weather strip 10 against corner portions of a car body improves, and that an installation operation of the weather strip 10 becomes easy. Moreover, the inner lips 13 have portions where notches 13 are unprovided, so that a holding strength of the weather strip 10 at corner portions of a car body can be firmly maintained.

According to a weather strip for a car without a metal insert of the invention, a grip body 12 is not comprised with a metal insert and at least the entire or about the entire of the grip body 12 is made of highly hardened rubber or resin having a hardness of more than Hs 90 degree, so that it can be firmly secured to a flange 3 with clips 17. Further, since this weather strip 10 does not comprise a metal insert, weight reduction and improvement of productivity can be achieved.

According to a weather strip for a car without a metal insert of the invention, a high rigid material 18 made of highly hardened rubber or resin is comprised instead of a metal insert, so that it can prevent a generation of rust, and that it can improve safetiness in an installation operation. Further, an improvement of productivity can be achieved by means of weight reduction. Moreover, the rigid material 18 largely exposes its inner surface side and the said side is not covered with resin of normal hardness, so that resin material is saved and a production cost decreases.

According to a weather strip for a car without a metal insert of the invention, the weather strip 10 is bent along a shape of corner portions and is heated and cooled, so that it is easily installed to a car body.

According to a weather strip for a car without a metal insert of the invention, a grip body 12 is bent in a shape along a corner portion of a car body with the remaining heat of the co-extrusion molding, so that it is unneeded to produce die molded parts. Therefore, a molding operation becomes easier and a production cost can be largely reduced.

According to a weather strip for a car without a metal insert of the invention, the outer wall 12*c* of the grip part 11 made of highly hardened rubber or resin having a hardness of more than 90 degree is shorter than the inner wall 12*b* of the grip part 11 made of highly hardened rubber or resin having a hardness of more than 90 degree, so that it is flexible and has a good followability against corner portions. Further, a grip body 12 is bent and formed into a shape along a shape of a corner portion by placing it in a die mold 31 and heating therein, so that it is unneeded to provide die molded parts. This reduces a production cost to a great extent.

The disclosure of Japanese Patent Applications No. 2002-257586 filed Sep. 3, 2002 and No.2003-000168 filed Jan. 6, 2003 including specifications, claims, and drawings, is incorporated herein by reference.

What is claimed is:

1. A weather strip for a car and free from a metal insert comprising:

a grip part comprising:

a rigid part generally U-shaped in cross section with an opening that defines a rigid part inner face therein, the rigid part having an outer face thereabout including a rear outer surface and adjacent opposing outer side surfaces, the rigid part having first and second corners that define the rear outer surface and the adjacent opposing outer side surfaces thereof, said rigid part having a hardness of more than Hs 90 degree;

a grip body integrally molded to the entirety of said inner face of said rigid part, said grip body having an inner face defining an inner bottom surface and facing inner side surfaces, said grip body including:

a first inner lip projecting into the opening from a first one of the facing inner side surfaces of said grip body; and a second plurality of inner lips projecting into the opening from the other of said facing inner side surfaces, each of said plurality of inner lips having a length less than the length of said first inner lip;

a cover lip integrally molded to the outer face of said rigid part at the second corner and projecting generally outwardly and away from said rigid part; and, a seal part secured to the outer face of said rigid part at first and second spaced locations and projecting generally outwardly and away from said grip part, the first location comprising the outer face of said rigid part at the first corner and the second location comprising the adjacent one of said outer side surfaces.

2. A weather strip for a car free from a metal insert, said weather strip comprising:

a grip part comprising:

a rigid part generally U-shaped in cross section with an opening defining an inner face therein having an inner bottom surface and facing inner side surfaces and an outer face thereabout defining a rear outer surface and adjacent opposing outer side surfaces, said rigid part having a hardness of more than Hs 90 degree and substantially the same thickness along the entire cross section thereof;

a first inner lip integrally molded to a first one of said facing inner side surfaces of said rigid part and projecting into the opening;

a second plurality of inner lips integrally molded to the other of said facing inner side surfaces of said rigid part and projecting into the opening and spaced by exposed sections of said other inner side surface, each of the plurality of said inner lips having a length less than the length of said first inner lip; and a grip body integrally molded to the rear outer surface of said rigid part and including a cover lip projecting generally outwardly and away from said rigid part, and, a seal part integrally molded to said grip part.

3. The weather strip of claim 2, wherein said seal part is integrally molded to one of said outer side surfaces of said rigid part of said grip part at a first location and secured to the grip body of said grip part at a second spaced location, said seal part projecting outwardly and away from the one of said outer side surfaces.

* * * * *